June 19, 1945.   D. E. GARR   2,378,766
DYNAMOMETER TEST SYSTEM
Filed Dec. 31, 1943
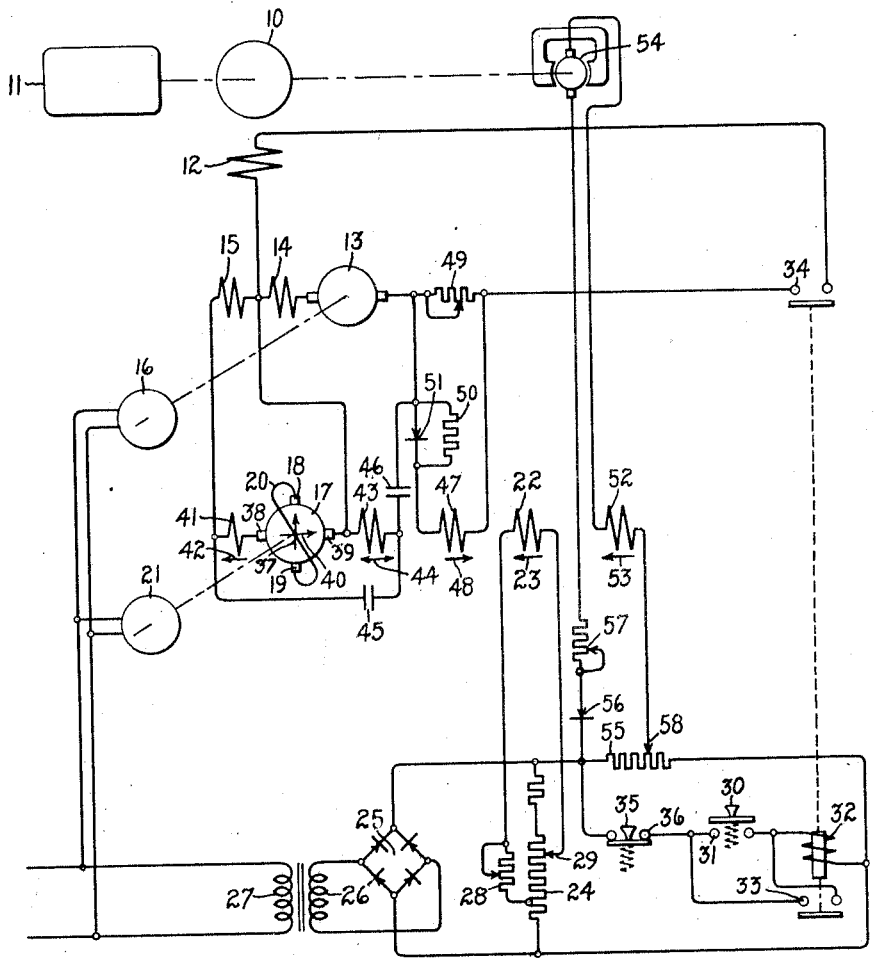
Inventor:
Donald E. Garr,
by Harry E. Dunham
His Attorney.

Patented June 19, 1945

2,378,766

UNITED STATES PATENT OFFICE 2,378,766

DYNAMOMETER TEST SYSTEM

Donald E. Garr, Schenectady, N. Y., assignor to General Electric Company, a corporation of New York Application December 31, 1943, Serial No. 516,585

10 Claims. (Cl. 73—116)

My invention relates to a test system and particularly to a dynamometer and its control which are adapted to be used in testing prime movers such as internal combustion engines.

An object of my invention is to provide an improved dynamometer test system.

Another object of my invention is to provide an improved test system provided with a dynamometer in which the excitation of the dynamometer is responsive to the speed of the dynamometer above a predetermined maximum value.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing schematically illustrates a test system embodying my invention.

Referring to the drawing, I have shown a test system including a dynamometer having a rotatable member 10 mechanically coupled to a prime mover 11 which is to be tested. The dynamometer is provided with a field exciting winding 12 which is adapted to be energized by an exciter having an armature 13 and provided with a commutating field exciting winding 14 and a control field exciting winding 15. The exciter 13 is adapted to be driven at a substantially constant speed by any suitable source of power, such as a motor 16, and its control field exciting winding 15 is adapted to be energized by another exciter of the amplidyne type. This latter dynamoelectric machine is of the cross-field type and is described and claimed in Patent 2,227,992, Alexanderson and Edwards, January 7, 1941, assigned to the same assignee as this application, and includes an armature 17 provided with a set of primary brushes 18 and 19 which are short circuited by an electrical conductor 20. This armature 17 is adapted to be driven at substantially constant speed by any suitable source of power, such as a constant speed motor 21, mechanically coupled thereto. This amplidyne exciter is provided with a main field exciting winding 22 which is adapted to provide a component of excitation indicated by the arrow 23 along the secondary commutating or load axis of the armature 17. This field exciting winding is adapted to be energized by a controllable voltage and is connected across a potentiometer 24 which is electrically connected across the terminals of a full wave rectifier 25 connected across the secondary winding 26 of a transformer whose primary winding 27 is supplied by electrical power from any suitable alternating current source. The energization of field exciting winding 22 is adapted to be controlled by a variable resistor 28 connected in series therewith and also by a movable contactor 29 on the potentiometer 24. The connection of the rheostat 28 to the potentiometer 24 is intermediate the terminals of the potentiometer such that movement of the potentiometer contact 29 is adapted to supply energization to the control field exciting winding 22 in either direction. The arrangement shown in the drawing is the usual operating connection for this field exciting winding. If the movable contact 29 of the potentiometer 24 is moved to the lower end of the potentiometer, a relatively small reverse energization will be provided to the field exciting winding 22 which will be sufficient to provide an excitation to the connected dynamoelectric machines in the system to neutralize residual magnetism in these machines.

In order to initiate operation of the system when the two exciters are driven by their respective motors, a starting switch 30 is depressed and closes a circuit through contacts 31 to energize a relay coil 32 across the full wave rectifier 25. This causes the relay to close a holding circuit through contacts 33, so as to maintain the relay in its energized position and also to close a circuit through contacts 34 which closes the circuit of the dynamometer field exciting winding 12 across the exciter 13. In order to remove the excitation from the system, a stop switch 35 is depressed so as to open a circuit between the contacts 36 and thereby deenergize the relay coil 32 which opens the holding circuit through the relay contacts 33 and opens the dynamometer field circuit through the relay contacts 34.

Operation of the amplidyne exciter produces a primary armature reaction 37 which induces a voltage between secondary or load brushes 38 and 39 which energizes the exciter field exciting winding 15. The load current through the armature 17 produces a secondary or load component of armature reaction, indicated by the arrow 40, which tends to oppose the control component of excitation 23. In order to increase the sensitivity of response of the amplidyne exciter, a compensating field exciting winding 41 is connected in series with the load brushes of the amplidyne exciter and is arranged to provide a component of excitation, indicated by the arrow 42, which is substantially equal and opposite to the load component of armature reaction 40.

In this type system, it is desirable to minimize the duration of transient variations to stabilize the system, and this is obtained by providing a field exciting winding 43 adapted to supply a component of excitation, indicated by the arrow 44, along the secondary commutating axis of the amplidyne exciter. This stabilizing field exciting winding 43 is connected across the amplidyne exciter through a capacitor 45 such that its component of excitation is responsive to variations in the voltage of the amplidyne exciter. It also is connected across the main exciter armature 13 and its commutating field exciting winding 14 through a capacitor 46 to provide a component of excitation responsive to transient variations in the voltage of the main exciter 13. In this manner, the stabilizing field exciting winding 43 is adapted to oppose any transient variations in either of the two exciters.

It is desirable that the energizing current of the dynamometer field exciting winding 12 be limited to a safe value, and this is obtained by providing a field exciting winding 47 arranged to provide a differential component of excitation, indicated by the arrow 48, along the secondary commutating axis of the amplidyne exciter. This current limiting field exciting winding is connected across a potentiometer 49 electrically connected in series with the dynamometer field exciting winding 12, and is also connected in series with a non-linear resistance circuit which includes a conventional resistor 50 connected in parallel with a one-way rectifier 51 which has a non-linear voltage-current characteristic. With this arrangement, the energization of the current limiting field exciting winding 47 is responsive to the current in the field exciting winding 12, but is substantially ineffective in providing any excitation below a predetermined value of current due to the magnitude of the resistor 50 and due to the non-linear characteristic of the rectifier 51. To provide this characteristic, the rectifier 51 is adapted to pass only a very small current for low values of voltage across a potentiometer 49 and to pass a relatively large current above a predetermined voltage. Thus by adjusting the potentiometer 49, it is possible to adjust the maximum current through the field exciting winding 12 by controlling the current which is passed through the rectifier 51 and thus controlling the differential component of excitation 48 which is adapted to oppose the main control component of excitation 23.

In such systems, it is often desirable that the torque of the dynamometer should vary with the speed of the prime mover and, in some cases, that the torque vary about as the cube of the speed to simulate the loading of the prime mover by a fan, a blower, a propeller, or similar driven load. This is obtained in the present system by providing a field exciting winding 52 adapted to provide a cumulative component of excitation along the secondary commutating axis of the amplidyne exciter, as indicated by the arrow 53 which is controllable to approximate this condition very closely for a given speed range. This field exciting winding is adapted to be energized above a predetermined speed of the dynamometer 10 and the prime mover 11 by a speed responsive voltage generated by a tachometer generator 54 mechanically connected to the dynamometer 10 so as to be driven thereby at a speed responsive to the speed of the dynamometer and the prime mover. The field exciting winding is connected across the tachometer generator 54 in opposition to a controllable constant voltage provided by a potentiometer 55 which is connected across the full wave rectifier 25. A one-way rectifier 56 is connected in series with the field exciting winding 52 to prevent the flow of current through this field exciting winding for all values of voltage generated by the tachometer generator 54 below the voltage across the potentiometer 55. A variable resistance 57 is connected in series with the field exciting winding 52 to provide the desired approximation to a cube variation of the excitation provided by this field exciting winding with variations in the speed of the prime mover. This is obtained by setting the variable resistance 57 to give the voltage-speed characteristic curve of the machine a slope which approximates a cube curve over a given range of operation. Obviously, for other speed ranges, the setting of the resistance 57 must be changed to change the slope of the voltage-speed characteristic for the different speed range. When the speed responsive voltage of the tachometer generator 54 exceeds the voltage of the potentiometer 55, an energizing current will flow through the speed responsive field exciting winding 52 so as to provide a component of excitation in the same direction as the main control component of excitation 23 which will cause an increase in the energization of the dynamometer field exciting winding 12, so as to increase the torque of the dynamometer. The relative increase in torque with increase in speed can be varied as desired by changing the series resistance 57 to give a cube variation for a different speed range, and the value of the speed at which the field exciting winding becomes effective can be controlled by varying the reference voltage supplied by the potentiometer 55 by moving a potentiometer contactor 58. Thus, by proper adjustment of the speed responsive field exciting winding 52 and of the main control field exciting winding 22, an operator can obtain any desired speed-torque characteristic for the system.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A test system for a prime mover including a dynamometer having a field exciting winding, means for energizing said field exciting winding including an exciter having a field exciting winding, a second exciter for energizing said first-mentioned exciter field exciting winding, a stabilizing field exciting winding for said second exciter, means for energizing said stabilizing field exciting winding responsive to transient variations in the voltage of said second exciter, a main control field exciting winding for said second exciter, and means including a speed responsive field exciting winding for said second exciter responsive to variations in the speed of said prime mover for providing a component of excitation to said second exciter variable in the same sense as variations in said speed for varying the load on said dynamometer approximately as the cube of the speed of said dynamometer over a given speed range to maintain stable operation of said system.

2. A test system for a prime mover including a dynamometer having a field exciting winding, means for energizing said field exciting winding including an exciter having a field exciting winding, an amplidyne exciter for energizing said first-mentioned exciter field exciting winding, a stabilizing field exciting winding for said amplidyne exciter, means for energizing said stabilizing field exciting winding responsive to transient variations in the voltage of said amplidyne exciter arranged to provide a component of excitation for opposing said variations, a second energizing means for said stabilizing field exciting winding responsive to transient variations in the voltage of said first-mentioned exciter also arranged to provide a component of excitation for opposing said variations, a main control field exciting winding for said amplidyne exciter, and a load current compensating field exciting winding for said amplidyne exciter.

3. A test system for a prime mover including a dynamometer having a field exciting winding, means for energizing said field exciting winding including an exciter having a field exciting winding, a second exciter for energizing said first-mentioned exciter field exciting winding, a stabilizing field exciting winding for said second exciter, means for energizing said stabilizing field exciting winding responsive to transient variations in the voltage of said second exciter arranged to provide a component of excitation for opposing said variations, a second energizing means for said stabilizing field exciting winding responsive to transient variations in the voltage of said first-mentioned exciter also arranged to provide a component of excitation for opposing said variations, a main control field exciting winding for said second exciter, and means including a speed responsive field exciting winding for said second exciter responsive to variations in the speed of said prime mover for providing a component of excitation to said second exciter variable in the same sense as variations in said speed for varying the torque loading on said dynamometer correspondingly to maintain stable operation of said system.

4. A test system for a prime mover including a dynamometer having a field exciting winding, means for energizing said field exciting winding including an exciter having a field exciting winding, a second exciter for energizing said first-mentioned exciter field exciting winding, a stabilizing field exciting winding for said second exciter, means for energizing said stabilizing field exciting winding responsive to transient variations in the voltage of said second exciter arranged to provide a component of excitation for opposing said variations, a second energizing means for said stabilizing field exciting winding responsive to transient variations in the voltage of said first-mentioned exciter, a main control field exciting winding for said second exciter, and means including a current limiting field exciting winding for said second exciter arranged to provide a differential component of excitation to said second exciter above a predetermined value of current through said dynamometer field exciting winding for decreasing the excitation provided by said second exciter and limiting the current of said dynamometer field exciting winding.

5. A test system for a prime mover including a dynamometer having a field exciting winding, means for energizing said field exciting winding including an exciter having a field exciting winding, an amplidyne exciter for energizing said first-mentioned exciter field exciting winding, a stabilizing field exciting winding for said amplidyne exciter, means for energizing said stabilizing field exciting winding responsive to transient variations in the voltage of said amplidyne exciter arranged to provide a component of excitation for opposing said variations, a second energizing means for said stabilizing field exciting winding responsive to transient variations in the voltage of said first-mentioned exciter also arranged to provide a component of excitation for opposing said variations, a main control field exciting winding for said amplidyne exciter, and a load current compensating field exciting winding for said amplidyne exciter, and means including a speed responsive field exciting winding for said amplidyne exciter responsive to variations in the speed of said prime mover for providing a component of excitation to said amplidyne exciter variable in the same sense as variations in said speed and approximately as the cube of the speed for varying the torque of said dynamometer correspondingly to maintain stable operation of said system.

6. A test system for a prime mover including a dynamometer having a field exciting winding, means for energizing said field exciting winding including an exciter having a field exciting winding, a second exciter for energizing said first-mentioned exciter field exciting winding, a stabilizing field exciting winding for said second exciter, means for energizing said stabilizing field exciting winding responsive to transient variations in the voltage of said second exciter arranged to provide a component of excitation for opposing said variations, a main control field exciting winding for said second exciter, means including a speed responsive field exciting winding for said second exciter responsive to variations in the speed of said prime mover for providing a component of excitation to said second exciter variable in the same sense as variations in said speed for varying the torque of said dynamometer approximately as the cube of the speed of said dynamometer over a given speed range to maintain stable operation of said system, and means including a current limiting field exciting winding for said second exciter arranged to provide a differential component of excitation to said second exciter above a predetermined value of current through said dynamometer field exciting winding for decreasing the excitation provided by said second exciter and limiting the current of said dynamometer field exciting winding.

7. A test system for a prime mover including a dynamometer having a field exciting winding, means for energizing said field exciting winding including an exciter having a field exciting winding, an amplidyne exciter for energizing said first-mentioned exciter field exciting winding, a stabilizing field exciting winding for said amplidyne exciter, means for energizing said stabilizing field exciting winding responsive to transient variations in the voltage of said amplidyne exciter, a load current compensating field exciting winding for said amplidyne exciter, means including a speed responsive field exciting winding for said amplidyne exciter responsive to variations in the speed of said prime mover for providing a component of excitation to said amplidyne exciter variable in the same sense as variations in said speed for varying the torque of said dynamometer correspondingly and approximately as the cube of the speed to maintain stable operation of said system, and means including a current-limiting field exciting winding for said amplidyne exciter arranged to provide a differential component of excitation to said amplidyne exciter above a predetermined value of current through said dynamometer field exciting winding for decreasing the excitation provided by said amplidyne exciter and limiting the current of said dynamometer field exciting winding.

8. A test system for a prime mover including a dynamometer having a field exciting winding, means for energizing said field exciting winding including an exciter having a field exciting winding, an amplidyne exciter for energizing said first-mentioned exciter field exciting winding, a stabilizing field exciting winding for said amplidyne exciter, means for energizing said stabilizing field exciting winding responsive to transient variations in the voltage of said amplidyne exciter arranged to provide a component of excitation for opposing said variations, a second energizing means for said stabilizing field exciting winding responsive to transient variations in the voltage of said first-mentioned exciter arranged to provide a component of excitation for opposing said latter variations, a main control field exciting winding for said amplidyne exciter, a load-current compensating field exciting winding for said amplidyne exciter, and means including a current limiting field exciting winding for said amplidyne exciter arranged to provide a differential component of excitation to said amplidyne exciter above a predetermined value of current through said dynamometer field exciting winding for decreasing the excitation provided by said amplidyne exciter and limiting the current of said dynamometer field exciting winding.

9. A test system for a prime mover including a dynamometer having a field exciting winding, means for energizing said field exciting winding including an exciter having a field exciting winding, a second exciter for energizing said first-mentioned exciter field exciting winding, a stabilizing field exciting winding for said second exciter, means for energizing said stabilizing field exciting winding responsive to transient variations in the voltage of said second exciter arranged to provide a component of excitation for opposing said variations, a second energizing means for said stabilizing field exciting winding responsive to transient variations in the voltage of said first-mentioned exciter also arranged to provide a component of excitation for opposing said variations, a main control field exciting winding for said second exciter, means including a speed responsive field exciting winding for said second exciter responsive to variations in the speed of said prime mover for providing a component of excitation to said second exciter variable in the same sense as variations in said speed for varying the torque loading of said dynamometer correspondingly to maintain stable operation of said system, and means including a current limiting field exciting winding for said second exciter arranged to provide a differential component of excitation to said second exciter above a predetermined value of current through said dynamometer field exciting winding for decreasing the excitation provided by said second exciter and limiting the current of said dynamometer field exciting winding.

10. A test system for a prime mover including a dynamometer having a field exciting winding, means for energizing said field exciting winding including an exciter having a field exciting winding, an amplidyne exciter for energizing said first-mentioned exciter field exciting winding, a stabilizing field exciting winding for said amplidyne exciter, means for energizing said stabilizing field exciting winding responsive to transient variations in the voltage of said amplidyne exciter arranged to provide a component of excitation for opposing said variations, a second energizing means for said stabilizing field exciting winding responsive to transient variations in the voltage of said first-mentioned exciter also arranged to provide a component of excitation for opposing said variations, a main control field exciting winding for said amplidyne exciter, a load current compensating field exciting winding for said amplidyne exciter, means including a speed responsive field exciting winding for said amplidyne exciter responsive to variations in the speed of said prime mover for providing a component of excitation to said amplidyne exciter variable in the same sense as variations in said speed for varying the torque of said dynamometer approximately as the cube of the speed of said dynamometer over a given speed range to maintain stable operation of said system, and means including a current limiting field exciting winding for said amplidyne exciter arranged to provide a differential component of excitation to said amplidyne exciter above a predetermined value of current through said dynamometer field exciting winding for decreasing the excitation provided by said amplidyne exciter and limiting the current of said dynamometer field exciting winding.

DONALD E. GARR.